United States Patent
Sambonsugi et al.

(10) Patent No.: US 10,136,088 B2
(45) Date of Patent: Nov. 20, 2018

(54) IMAGE PICKUP APPARATUS THAT REDUCES AMOUNT OF INFORMATION OF DEFECTIVE PIXELS, METHOD OF CONTROLLING THE SAME, AND STORAGE MEDIUM

(71) Applicant: CANON KABUSHIKI KAISHA, Tokyo (JP)

(72) Inventors: Hideaki Sambonsugi, Tokyo (JP); Toshiyuki Okubo, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/831,902

(22) Filed: Dec. 5, 2017

(65) Prior Publication Data

US 2018/0176494 A1 Jun. 21, 2018

(30) Foreign Application Priority Data

Dec. 20, 2016 (JP) .................................. 2016-246748

(51) Int. Cl.
*H04N 5/367* (2011.01)
*H04N 5/232* (2006.01)
*H04N 5/341* (2011.01)

(52) U.S. Cl.
CPC ......... *H04N 5/367* (2013.01); *H04N 5/23212* (2013.01); *H04N 5/341* (2013.01)

(58) Field of Classification Search
CPC .... H04N 5/23212; H04N 5/357; H04N 5/367; H04N 5/341
See application file for complete search history.

(56) References Cited

U.S. PATENT DOCUMENTS

| | | | | |
|---|---|---|---|---|
| 2010/0073527 A1* | 3/2010 | Ichimiya | ............ | H04N 5/23212 348/247 |
| 2010/0245631 A1* | 9/2010 | Hoda | .................... | G03B 13/36 348/241 |
| 2012/0320241 A1* | 12/2012 | Sugawara | ............ | H04N 5/3696 348/246 |

FOREIGN PATENT DOCUMENTS

JP 2011082634 A 4/2011
JP 2015080123 A 4/2015

* cited by examiner

*Primary Examiner* — Nelson D. Hernández Hernández
(74) *Attorney, Agent, or Firm* — Rossi, Kimms & McDowell LLP

(57) ABSTRACT

An image pickup apparatus enabling reduction of information amount of defective pixels of an image pickup device having pixels pupil-dividing light through a photographic optical system. Each pixel is provided with PD portions for one micro lens for pupil-division of the light. First image data is generated by adding all signals from the PD portions, and second image data is generated by a signal output from one PD portion or by adding signals from part of PD portions. First defect information indicates defect information of the first image data, and second defect information is formed by excluding information redundant with the first defect information from defect information of the second image data. Defective pixels included in the second image data are designated based on the first defect information and the second defect information. The second image data is corrected by correcting the designated defective pixels.

15 Claims, 12 Drawing Sheets

FIG. 2A
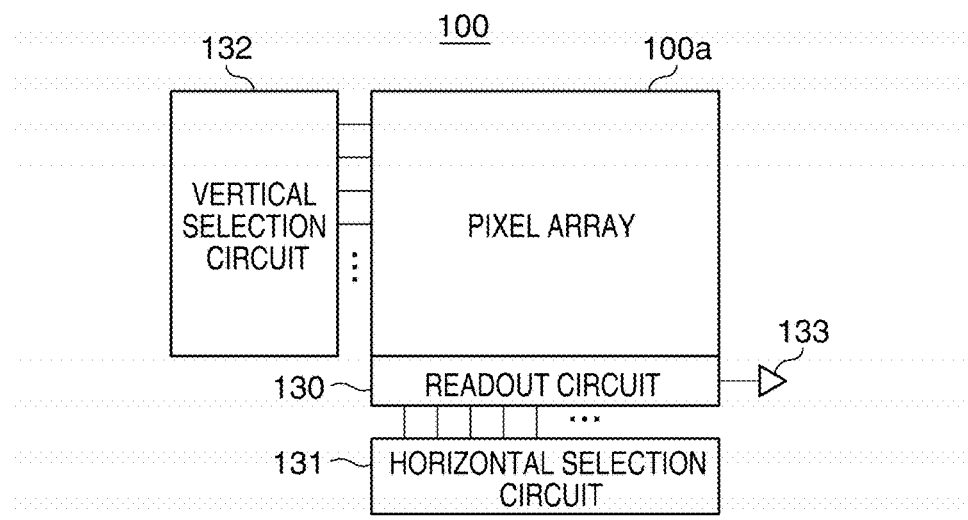
FIG. 2B
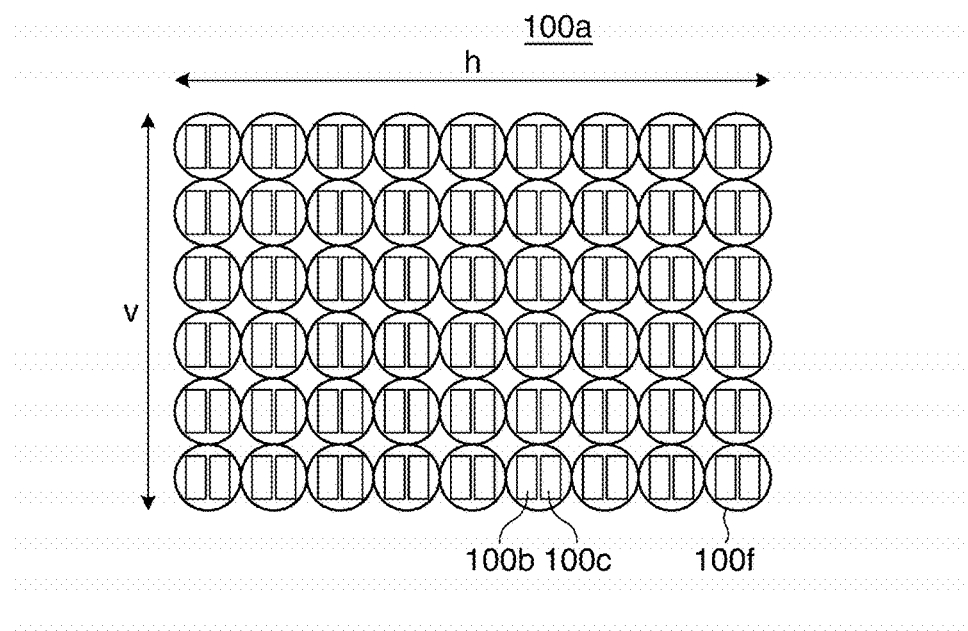
FIG. 2C
| A-IMAGE | AB-IMAGE |

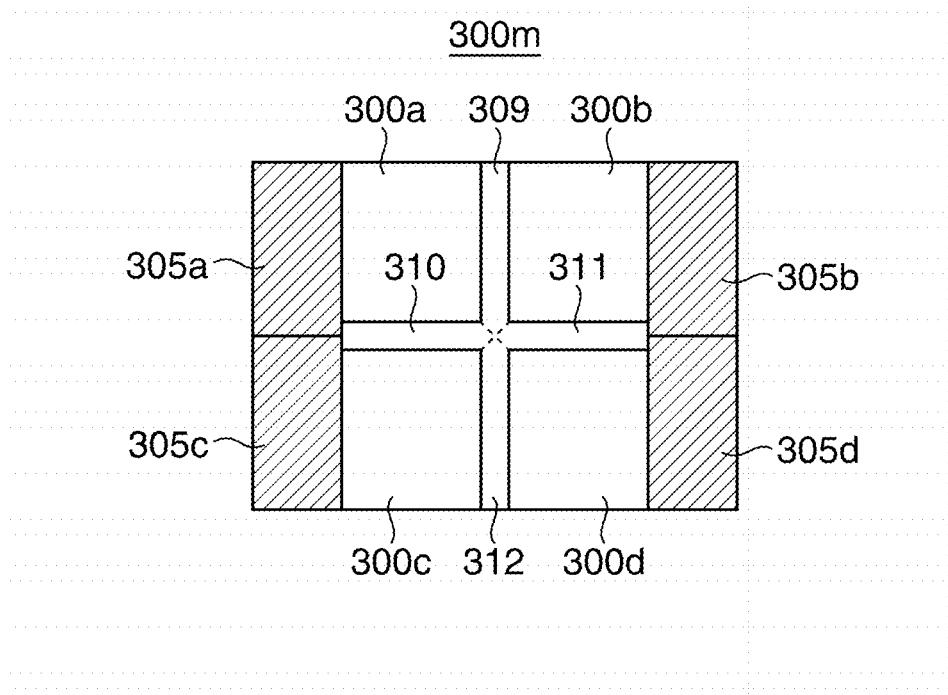

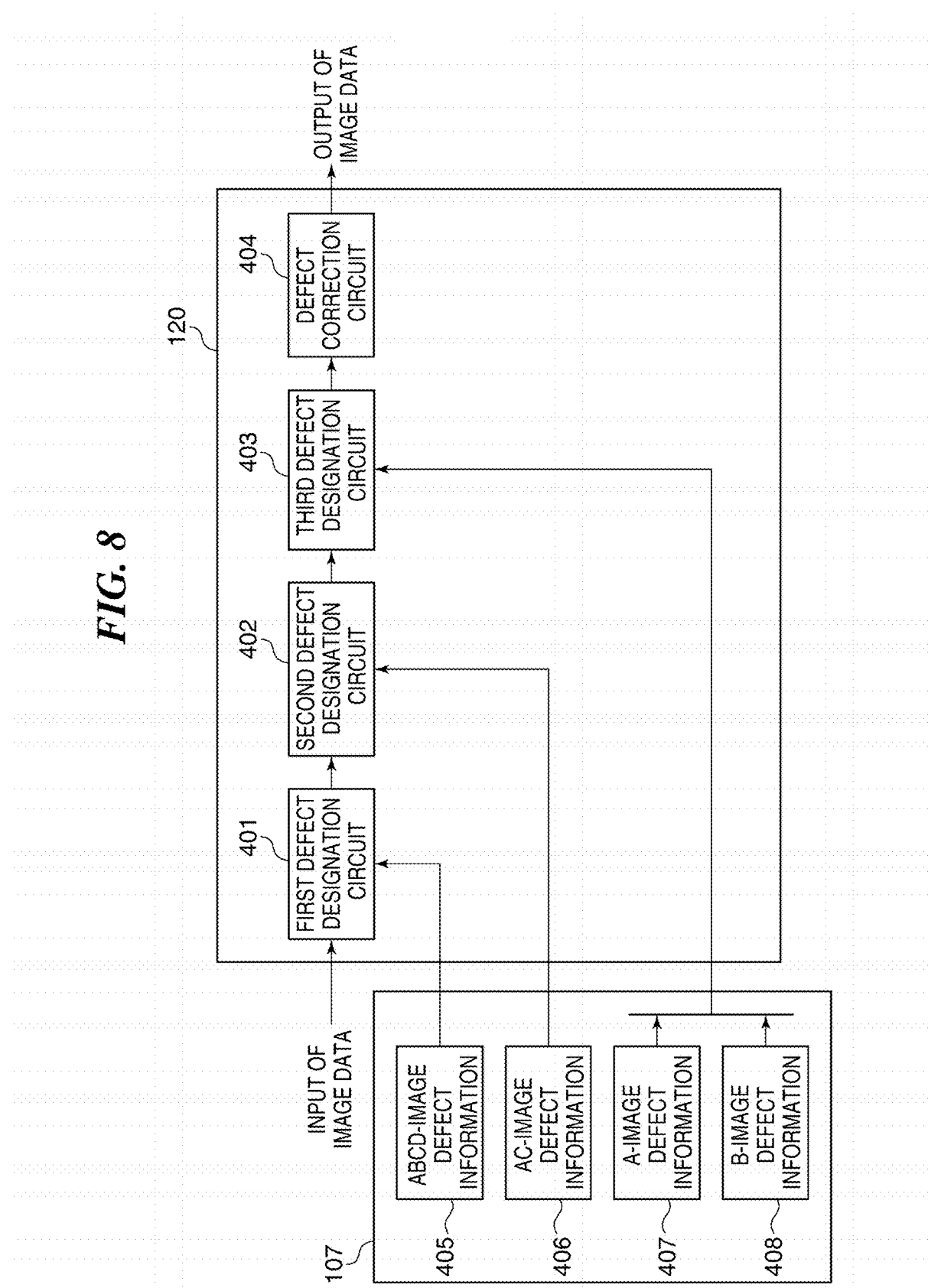

FIG. 11
| DEFECT TYPE | MERGING METHOD |
|---|---|
| WHITE SPOT DEFECT | ADDITION |
| SENSITIVITY DEFECT | AVERAGING |
| FD LEAK DEFECT | ADDITION |
| RTS DEFECT | ADDITION |
| IMAGE PROPER DEFECT | DIRECT USE |
FIG. 12
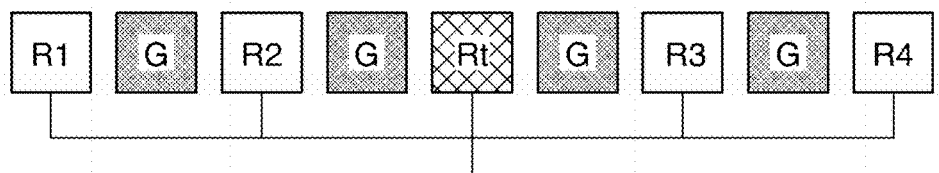
FIG. 13
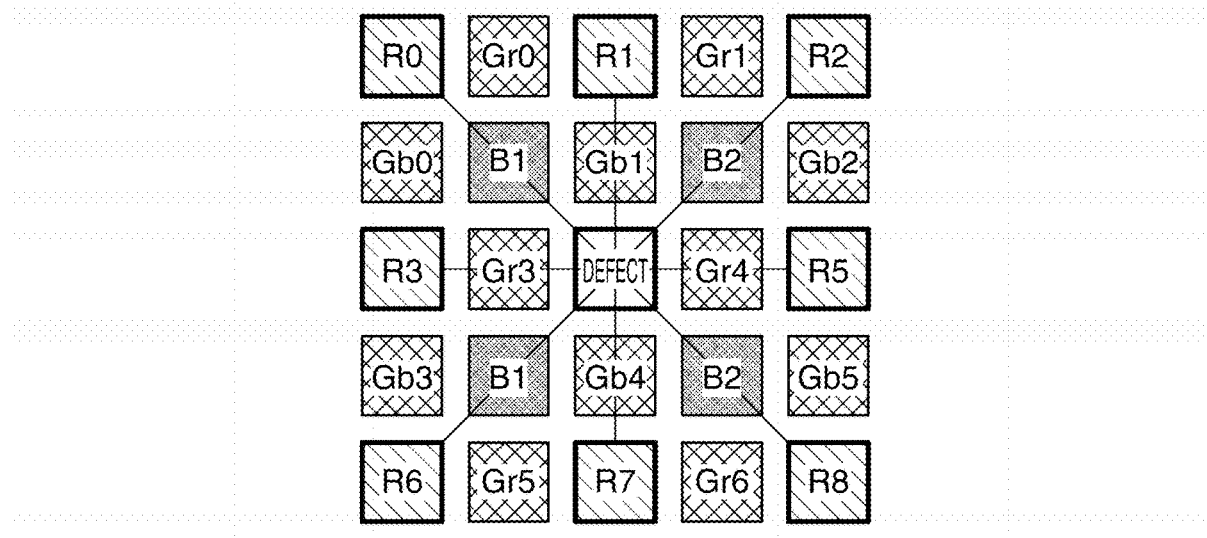

IMAGE PICKUP APPARATUS THAT REDUCES AMOUNT OF INFORMATION OF DEFECTIVE PIXELS, METHOD OF CONTROLLING THE SAME, AND STORAGE MEDIUM

BACKGROUND OF THE INVENTION

Field of the Invention

The present invention relates to an image pickup apparatus, a method of controlling the same, and a storage medium, and more particularly to a technique for correcting defects of an image picked up by an image pickup apparatus that includes an image pickup device having pixels which pupil-divide light passing through a photographic optical system.

Description of the Related Art

An image pickup device, such as a CCD image sensor or a CMOS image sensor, used in an image pickup apparatus, such as a digital camera, has a structure in which a plurality of pixels each including a photoelectric conversion portion are two-dimensionally arranged. The plurality of pixels forming the pixel array often include defective pixels which output only electric signals each having an abnormal level when the whole light receiving surface of the image pickup device is irradiated with incident light having a uniform level. If an image is formed using signals output from such defective pixels without correcting the signals, image quality is degraded. To solve this problem, Japanese Laid-Open Patent Publication (Kokai) No. 2011-82634, for example, has proposed a technique for storing information on defective pixels of the image pickup device (hereinafter referred to as the "defect information"), such as the addresses of the defective pixels, in a nonvolatile memory, before the image pickup apparatus is shipped from a factory, and correcting outputs from the defective pixels by referring to the defect information, when performing actual shooting.

Incidentally, there has been known an image pickup device having pixels each provided with a plurality of photodiodes arranged with respect to one micro lens to thereby pupil-divide an exit pupil of a photographic optical system, and as an automatic focus (AF) control method using such an image pickup device, there has been known an imaging surface phase difference AF method. The imaging surface phase difference AF method makes it possible to obtain a focus position by calculating a defocus amount based on the phase difference between outputs from divided pixels provided in the image pickup device for ranging purposes, and hence it is possible to perform focus detection in a short time period. However, if defective pixels which output abnormal signals are included in the divided pixels for ranging, the ranging performance is lowered, and hence similar to the above-mentioned necessity of correction of outputs from the defective pixels in image formation, defect correction is required. To cope with this, Japanese Laid-Open Patent Publication (Kokai) No. 2015-80123, for example, has proposed a technique for storing defect information of pixels for image pickup and defect information of pixels for ranging, in a nonvolatile memory, and correcting the defects by separately retrieving each defect information when performing shooting.

In the technique described in Japanese Laid-Open Patent Publication (Kokai) No. 2011-82634, defective pixels are extracted from all pixels of the image pickup device. In this case, in the image pickup device having pixels each provided with a plurality of photodiodes arranged with respect to one micro lens to pupil-divide light passing through the photographic optical system, the number of targets required to be subjected to defective pixel detection is equal to the number of photodiodes. As a result, the amount of information on defective pixels is increased, which requires a large storage capacity of a storage unit, such as a nonvolatile memory, for storing the information on defective pixels.

Further, there has been known an image pickup device using the pixels for ranging also as the pixels for image pickup, and in this case, it is necessary to correct both of images for ranging and images for shooting. If the technique described in Japanese Laid-Open Patent Publication (Kokai) No. 2015-80123 is applied to this image pickup device, after defective data of the pixels for ranging is separated, data as a substitute for the defective data of the pixels for ranging is calculated by interpolation using data of the surrounding pixels for image pickup, and hence it is impossible to perform ranging calculation without being affected by the defective pixels.

SUMMARY OF THE INVENTION

The present invention provides an image pickup apparatus that makes it possible to reduce the amount of information on defective pixels of an image pickup device having pixels which pupil-divide light passing through a photographic optical system.

In a first aspect of the present invention, there is provided an image pickup apparatus comprising an image pickup device that has a plurality of pixels each of which is provided with a plurality of photoelectric conversion portions with respect to one micro lens thereof, such that light passing through a photographic optical system is pupil-divided, a holding unit configured to hold first defect information indicative of defect information of first image data generated by adding all signals output from the plurality of photoelectric conversion portions of each of the plurality of pixels and reading out a resulting added signal, and second defect information obtained by excluding information redundant with the first defect information from defect information of second image data generated by reading out a signal from one of the plurality of photoelectric conversion portions of each of the plurality of pixels or by adding signals output from part of the plurality of photoelectric conversion portions and reading out a resulting added signal, a designation unit configured to designate defective pixels included in the second image data based on the first defect information and the second defect information, and a correction unit configured to correct the second image data by correcting defective pixels designated by the designation unit.

In a second aspect of the present invention, there is provided an image pickup apparatus comprising an image pickup device that has a plurality of pixels each of which is provided with a plurality of photoelectric conversion portions with respect to one micro lens thereof, such that light passing through a photographic optical system is pupil-divided, a readout unit configured to read out a plurality of pupil-divided images from the image pickup device, a holding unit configured to hold defect information on defective pixels included in each of the plurality of pupil-divided images, on an image-by-image basis, and a generation unit configured to generate information on defective pixels included in an image for storage, by switching a method of generating the information on the defective pixels included in the image for storage, based on the defect information held for each of the plurality of pupil-divided images, according to a method of reading out signals from the plurality of photoelectric conversion portions, or according to a defect type of defective pixels indicated by the defect information.

In a third aspect of the present invention, there is provided a method of controlling an image pickup apparatus including an image pickup device that has a plurality of pixels each of which is provided with a plurality of photoelectric conversion portions with respect to one micro lens thereof, such that light passing through a photographic optical system is pupil-divided, comprising generating first image data by adding all signals output from the plurality of photoelectric conversion portions of each of the plurality of pixels and reading out a resulting added signal, generating second image data by reading out a signal from one of the plurality of photoelectric conversion portions of each of the plurality of pixels or by adding signals output from part of the plurality of photoelectric conversion portions and reading out a resulting added signal, designating defective pixels included in the second image data, based on first defect information indicative of defect information of the first image data and second defect information formed by excluding information redundant with the first defect information from defect information of the second image data, and correcting the second image data by correcting the designated defective pixels.

In a fourth aspect of the present invention, there is provided a method of controlling an image pickup apparatus including an image pickup device that has a plurality of pixels each of which is provided with a plurality of photoelectric conversion portions with respect to one micro lens thereof, such that light passing through a photographic optical system is pupil-divided, comprising reading out a plurality of pupil-divided images from the image pickup device, generating information on defective pixels included in an image for storage, based on defect information on defective pixels included in each of the plurality of pupil-divided images, and correcting defective pixels included in the image for storage, using the generated information, wherein a method of generating the information on the defective pixels included in the image for storage is switched, according to a method of reading out signals from the plurality of photoelectric conversion portions, or according to a defect type of defective pixels indicated by the defect information of each of the plurality of pupil-divided images.

In a fifth aspect of the present invention, there is provided a non-transitory computer-readable storage medium storing a computer-executable program for executing a method of controlling an image pickup apparatus including an image pickup device that has a plurality of pixels each of which is provided with a plurality of photoelectric conversion portions with respect to one micro lens thereof, such that light passing through a photographic optical system is pupil-divided, wherein the method comprises generating first image data by adding all signals output from the plurality of photoelectric conversion portions of each of the plurality of pixels and reading out a resulting added signal, generating second image data by reading out a signal from one of the plurality of photoelectric conversion portions of each of the plurality of pixels or by adding signals output from part of the plurality of photoelectric conversion portions and reading out a resulting added signal, designating defective pixels included in the second image data, based on first defect information indicative of defect information of the first image data and second defect information formed by excluding information redundant with the first defect information from defect information of the second image data, and correcting the second image data by correcting the designated defective pixels.

In a sixth aspect of the present invention, there is provided a non-transitory computer-readable storage medium storing a computer-executable program for executing a method of controlling an image pickup apparatus including an image pickup device that has a plurality of pixels each of which is provided with a plurality of photoelectric conversion portions with respect to one micro lens thereof, such that light passing through a photographic optical system is pupil-divided, wherein the method comprises reading out a plurality of pupil-divided images from the image pickup device, generating information on defective pixels included in an image for storage, based on defect information on defective pixels included in each of the plurality of pupil-divided images, and correcting defective pixels included in the image for storage, using the generated information, wherein a method of generating the information on the defective pixels included in the image for storage is switched, according to a method of reading out signals from the plurality of photoelectric conversion portions, or according to a defect type of defective pixels indicated by the defect information of each of the plurality of pupil-divided images.

According to the present invention, it is possible to reduce the amount of information on defective pixels of the image pickup device having pixels which pupil-divide light passing through the photographic optical system.

Further features of the present invention will become apparent from the following description of exemplary embodiments (with reference to the attached drawings).

BRIEF DESCRIPTION OF THE DRAWINGS

FIGS. 2A to 2C are diagrams useful in explaining the configuration of an image pickup device included in an image pickup apparatus according to a first embodiment.

FIG. 7 is a diagram showing a structure of a photodiode for a pixel of the image pickup device.

FIG. 8 is a block diagram of a defect correction section included in the image pickup apparatus according to the second embodiment.

FIG. 11 is a diagram useful in explaining a method of merging A-image defect information and B-image defect information.

FIG. 12 is a diagram useful in explaining a simple defect correction method for correcting image data for ranging.

FIG. 13 is a diagram useful in explaining a highly accurate defect correction method for correcting image data for storage.

DESCRIPTION OF THE EMBODIMENTS

Figure 1:
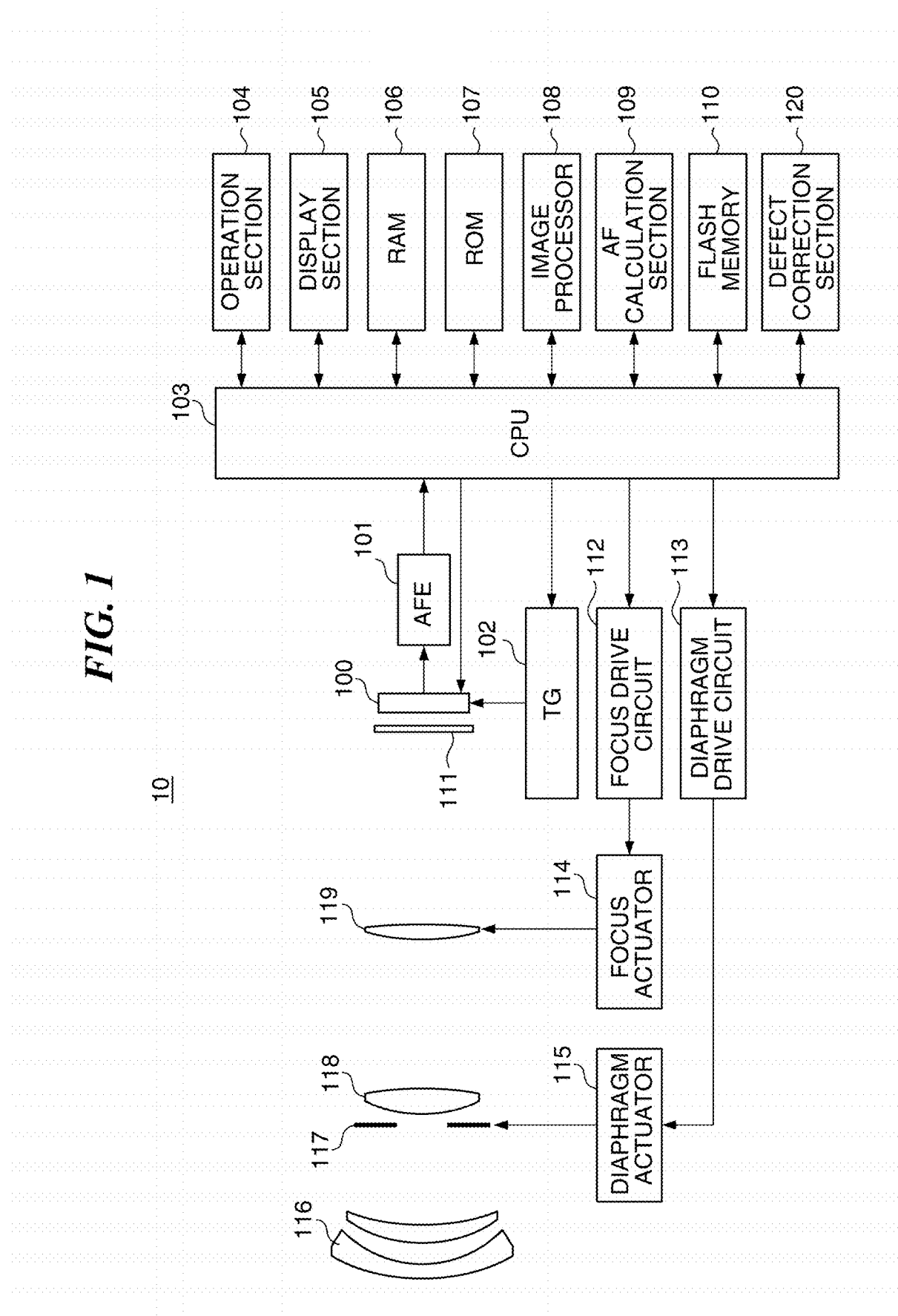
FIG. 1 is a schematic diagram showing the configuration of an image pickup apparatus according to embodiments of the present invention.

The present invention will now be described in detail below with reference to the accompanying drawings showing embodiments thereof. FIG. 1 is a schematic diagram showing the configuration of an image pickup apparatus 10 according to embodiments of the present invention. Although in the present embodiments, a digital camera for acquiring a moving image and/or a still image is described as an example of the image pickup apparatus 10, the present invention is not limited to this, but can also be applied to a monitoring camera, a mobile phone, an on-vehicle (mobile) camera, etc. The image pickup apparatus 10 includes an image pickup device 100, an analog front end 101 (hereinafter referred to as the "AFE 101"), a timing generator 102 (hereinafter referred to as the "TG 102"), a CPU 103, an operation section 104, a display section 105, a RAM 106, and a ROM 107. Further, the image pickup apparatus 10 includes an image processor 108, an AF calculation section 109, a flash memory 110, a focal plane shutter 111, a focus drive circuit 112, a diaphragm drive circuit 113, a focus actuator 114, and a diaphragm actuator 115. Furthermore, the image pickup apparatus 10 includes a first lens group 116, a diaphragm 117, a second lens group 118, a third lens group 119, and a defect correction section 120.

The image pickup device 100 is controlled e.g. by the CPU 103, and generates analog electric signals by photoelectrically converting an optical image of an object, which is formed by a photographic optical system. The AFE 101 converts the analog electric signals output from the image pickup device 100 to digital signals by gain adjustment and according to predetermined quantization bits, whereby image data of a still image or a moving image, formed by digital signals, is generated. The TG 102 controls the timing of driving of the image pickup device 100 and the AFE 101. Although in the present embodiment, the AFE 101 and the TG 102 are disposed outside the image pickup device 100, these components may be incorporated in the image pickup device 100.

The RAM 106 functions as an image data storage unit for temporarily storing image data output from the AFE 101 and image data processed by the image processor 108, and as a work memory used by the CPU 103 for performing operations, including execution of programs. Note that the functions of the RAM 106 may be realized by any other memory, insofar as it is a memory which can be accessed at a sufficiently high speed without causing an operational problem. The ROM 107 stores programs to be executed by the CPU 103 for controlling the operations of the components of the image pickup apparatus 10. The ROM 107 also stores information on addresses and the like of defective pixels included in the image pickup device 100 (defect information). Here, the defect information of a defective pixel includes, in addition to the address of the defective pixel, at least a defect level corresponding to a degree of the defect of the defective pixel and a defect type associated with a cause of the same. For example, a flash ROM is used as the ROM 107, but any other memory may be used as the ROM 107 insofar as it is a memory which can be accessed at a sufficiently high speed without causing an operational problem. The CPU 103 controls the operations of the components of the image pickup apparatus 10 by loading predetermined programs stored in the ROM 107 into a work area of the RAM 106 to thereby control the overall operation of the image pickup apparatus 10. The image processor 108 performs predetermined image processing, such as correction and compression, on image data output from the AFE 101 to thereby generate various image data.

The AF calculation section 109 performs focus detection, using A-image data and B-image data generated by the image processor 108 for use in focus detection, by the imaging surface phase difference AF method. The A-image data and the B-image data will be described hereinafter. The flash memory 110 can be removably mounted on the body of the image pickup apparatus 10, and stores still image data and moving image data generated by the image processor 108. Note that a storage medium into and from which data can be written and read out, such as a nonvolatile memory or a hard disk, may be used in place of the flash memory 110, and further, such a storage medium may be incorporated in the body of the image pickup apparatus 10. According to a user's operation, the operation section 104 gives an instruction to the CPU 103 e.g. for execution of shooting, making settings of shooting conditions, or the like. The display section 105 is implemented e.g. by a liquid crystal panel, and displays a through-the-lens (TTL) image (object image), a photographed still image or moving image which is being reproduced, selection menus, and so forth.

The first lens group 116 is disposed at a front end of the photographic optical system, and is held in a manner movable forward and backward in an optical axis direction. By adjusting the aperture diameter of the diaphragm 117, the amount of light received when shooting is performed is adjusted. The second lens group 118 is moved forward and backward in the optical axis direction in unison with the diaphragm 117 to thereby realize a magnification changing operation (zoom function) in accordance with the moving of the first lens group 116 forward and backward. The third lens group 119 is a so-called focus lens, and is moved forward and backward in the optical axis direction to thereby adjust the focus of the photographic optical system. The focal plane shutter 111 adjusts the exposure time in seconds in still image shooting. Note that in place of the configuration in which the focal plane shutter 111 adjusts the time in seconds of exposure to the image pickup device 100, the image pickup device 100 may be configured to have an electronic shutter function, and adjust the exposure time in seconds by control pulses. The focus drive circuit 112 controls the driving of the focus actuator 114 based on a result of focus detection by the AF calculation section 109, and adjusts the focus position of the photographic optical system by driving the third lens group 119 to cause the same to move forward and backward in the optical axis direction. The diaphragm drive circuit 113 controls the driving of the diaphragm actuator 115 to thereby control the aperture of the diaphragm 117. The defect correction section 120 corrects pixel values of defective pixels of the image pickup device 100. Note that the above-described configuration of the image pickup apparatus 10 is common between the embodiments described hereafter.

Next, a description will be given of a first embodiment of the present invention. FIG. 2A is a diagram useful in explaining an example of the arrangement of the image pickup device 100. The image pickup device 100 includes a pixel array 100*a* in which pixels are two-dimensionally arrayed, a vertical selection circuit 132 for selecting a row of pixels in the pixel array 100*a*, and a horizontal selection circuit 131 for selecting a column of pixels in the pixel array 100*a*. Further, the image pickup device 100 includes a readout circuit 130 for reading out signals from pixels in the pixel array 100*a*, which are selected by the vertical selection circuit 132 and the horizontal selection circuit 131.

The vertical selection circuit 132 selects a row of the pixel array 100*a*, and asserts a readout pulse for the selected row, which is output from the TG 102, based on a horizontal synchronization signal output from the CPU 103. The readout circuit 130 is comprised of readout circuit portions, not shown, each provided on a column basis and including an amplifier and a memory, and stores each pixel signal output from the selected row in the memory of the associated readout circuit portion via the amplifier of the same. The pixel signals of one row, stored in the memories, are sequentially selected by the horizontal selection circuit 131, column by column, and are output to the outside via an amplifier 133. By repeating this operation the number of times corresponding to the number of rows, signals read out from all pixels of the pixel array 100*a* are output to the outside (AFE 101).

FIG. 2B is a plan view showing the arrangement of the pixel array 100*a*. In the following description, "PD" represents a photodiode which is photoelectric conversion means. The pixel array 100*a* has a micro lens array formed by arranging h number of micro lenses 100*f* and v number of micro lenses 100*f* on a plane, in a horizontal direction and a vertical direction, respectively. One pixel has a structure in which one micro lens 100*f* is provided for a PD 100*b* and a PD 100*c*. The PD 100*b* and the PD 100*c* are photoelectric conversion portions formed by separating one PD by an element isolating region, as described hereinafter with reference to FIG. 3. Therefore, by defining image pickup areas (corresponding to photoelectric conversion portions) sharing one micro lens 100*f* as one pixel, the pixel array 100*a* has a structure in which h number of pixels and v number of pixels are arranged in the horizontal direction and the vertical direction, respectively. As an example of the image pickup area in the present embodiment, the h number of pixels are 8192 pixels, and the v number of pixels are 4320 pixels.

The image pickup device 100 is formed by the pixels each of which is provided with the plurality of photoelectric conversion portions (two PDs 100*b* and 100*c* in the present example) with respect to the one micro lens 100*f*, and thereby pupil-divides light passing through the photographic optical system. Optical images having a phase difference generated by the pupil-dividing configuration described above enter the PD 100*b* and the PD 100*c*, respectively. In the present embodiment, an image generated by photoelectric conversion performed by the PDs 100*b* of the pixels is referred to as the A-image, and an image generated by photoelectric conversion performed by the PDs 100*c* of the pixels is referred to as the B-image. FIG. 2C shows the A-image and an AB-image formed based on pixel signals output from the image pickup device 100. From the image pickup device 100, there are read out the A-image (second image data) based on signals output only from the PDs 100*b* and the AB-image (first image data) based on signals obtained by adding the signals output from the PDs 100*b* and signals output the PDs 100*c*. In the present embodiment, the image processor 108 calculates signals of the B-image by subtracting signals of the A-image from signals of the AB-image. However, the B-image may be read out in place of the A-image or the AB-image. The AF calculation section 109 calculates a defocus amount based on a phase difference between the A-image and the B-image using the imaging surface phase difference AF method. Note that for calculation of the defocus amount by the imaging surface phase difference AF method, a well-known technique can be used, and hence description thereof is omitted.

Figure 3:
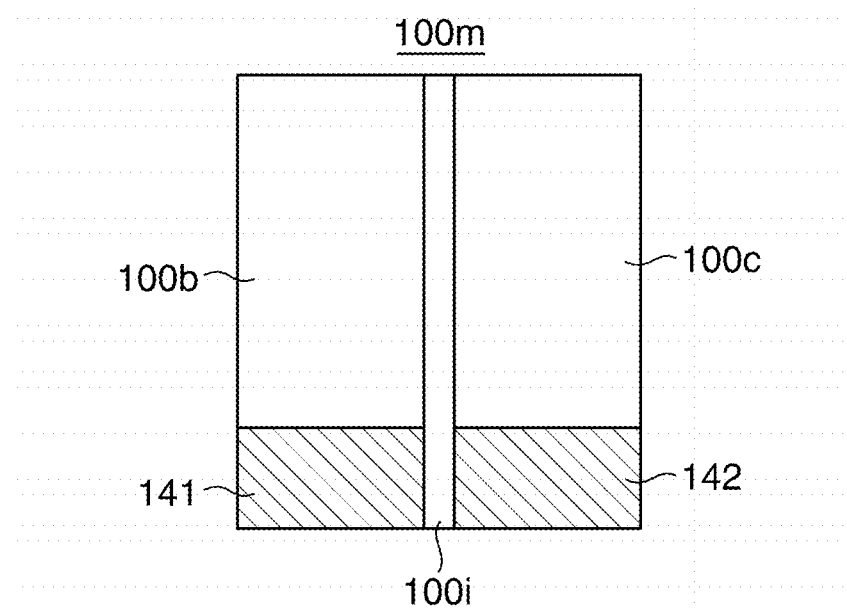
FIG. 3 is a diagram showing a structure of a photodiode for a pixel of the image pickup device.

Next, causes of defects of a pixel in the image pickup device 100 will be described. FIG. 3 is a diagram showing the arrangement of a PD 100*m* corresponding to one pixel. The PD 100*m* includes the PD 100*b*, the PD 100*c*, the element isolating region, denoted by reference numeral 100*i*, which separates between the PD 100*b* and the PD 100*c*, a transfer gate 141, and a transfer gate 142. The transfer gate 141 controls on/off of readout of an electric charge (signal) from the PD 100*b*, and transfers the electric charge read out from the PD 100*b* to the readout circuit 130 (associated readout circuit portion thereof). Similarly, the transfer gate 142 controls on/off of readout of an electric charge from the PD 100*c*, and transfers the electric charge read out from the PD 100*c* to the readout circuit 130 (associated readout circuit portion thereof).

The defects of a pixel include two main types. A first-type defect (hereafter referred to as "the first defect") is caused by mixing of impurities into the PD 100*m* or an abnormality of the transfer gate 141 or 142, and a second-type defect (hereafter referred to as "the second defect") is caused by an abnormality of the element isolating region 100*i*. However, the causes of defects are not limited to those classified as above. A pixel having the first defect causes a defect in both of the read-out A-image and AB-image. On the other hand, a pixel having the second defect causes a defect in the A-image read out due to mixing of an electric charge of the adjacent PD, but does not cause a defect in the AB-image because it does not cause an abnormality of the sum of electric charges of PDs adjacent to each other.

Figure 4:
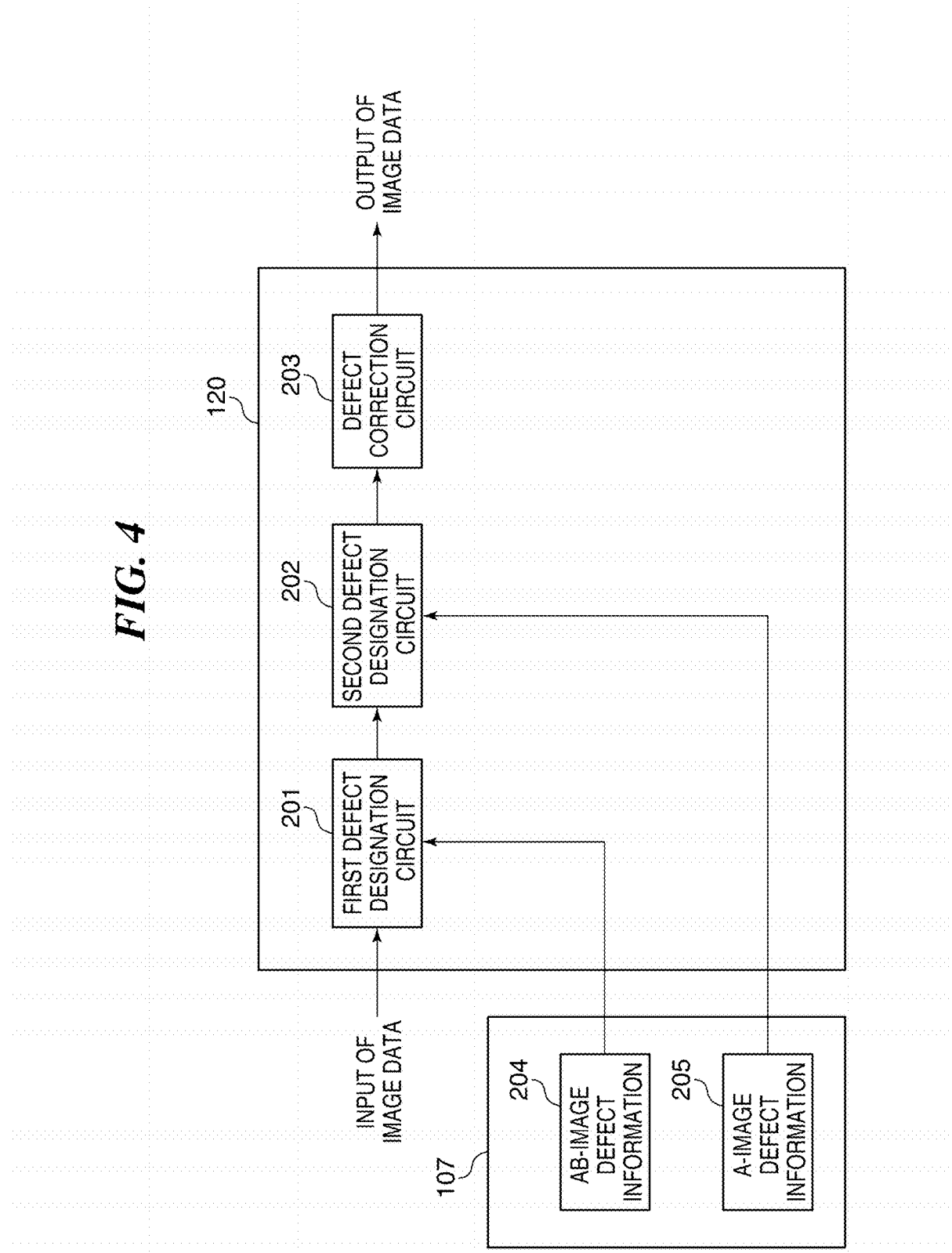
FIG. 4 is a block diagram of a defect correction section included in the image pickup apparatus according to the first embodiment.

Next, the defect correction section 120 will be described. FIG. 4 is a block diagram of the defect correction section 120 provided in the image pickup apparatus 10 including the image pickup device 100 having the pixel array 100*a*. The defect correction section 120 includes a first defect designation circuit 201, a second defect designation circuit 202, and a defect correction circuit 203. AB-image defect information 204 which is first defect information stored in the ROM 107 (or the RAM 106) is input to the first defect designation circuit 201. The AB-image defect information 204 is information (addresses) of defective pixels extracted by evaluating the AB-image in an inspection process for the image pickup device 100, and includes addresses of pixels having the above-mentioned first defect. The first defect designation circuit 201 adds a flag indicative of a defect (defect flag (damage mark)) to each of pixels (pixel data) included in the AB-image data and corresponding to respective addresses included in the AB-image defect information 204. In the description given above, the term "pixel" is used to represent hardware for generating image data (picture element), but in the following, it is also used to represent image data (picture element) itself.

A-image defect information 205 which is second defect information stored in the ROM 107 is input to the second defect designation circuit 202. The A-image defect information 205 is information (addresses) of defective pixels specific to the A-image, obtained by deleting the addresses included in the AB-image defect information 204 from the addresses of the defective pixels extracted by evaluating the A-image in the inspection process for the image pickup device 100, and includes addresses of pixels having the above-mentioned second defect. The second defect designation circuit 202 adds a defect flag to each of pixels included in the A-image data and corresponding to respective addresses included in the A-image defect information 205. In a case where a pixel input to the defect correction circuit 203 has a defect flag added thereto, the defect correction circuit 203 performs defect correction by calculating a pixel value by interpolation using pixel values of surrounding pixels for which the same color filter is provided.

Figure 5:
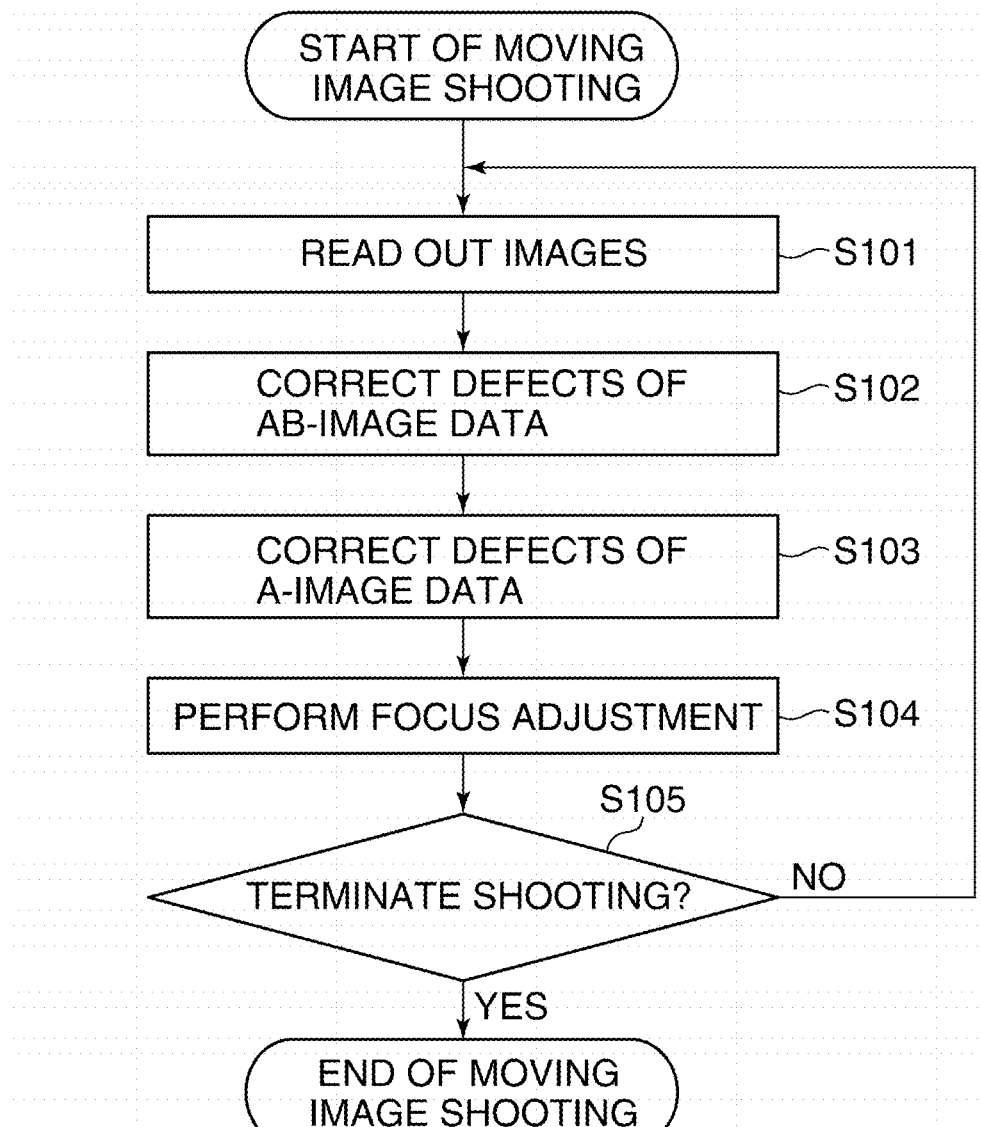
FIG. 5 is a flowchart of a moving image-shooting process performed by the image pickup apparatus according to the first embodiment.

Next, a shooting operation performed by the image pickup apparatus 10 will be described. FIG. 5 is a flowchart of a moving image-shooting process performed by the image pickup apparatus 10. The processing of each step of the moving image-shooting process in FIG. 5 is realized by the CPU 103 that controls the operations of the components of the image pickup apparatus 10 by loading programs stored in the ROM 107 into the RAM 106. When moving image shooting is started by a user's operation of the operation section 104, in a step S101, the CPU 103 reads out an A-image and an AB-image from the image pickup device 100. The read A-image and AB-image are converted by the AFE 101 to A-image data and AB-image data which are digital data, and are stored in the RAM 106.

In a step S102, the CPU 103 transfers the AB-image data from the RAM 106 to the defect correction section 120, and transfers the AB-image defect information 204 to the first defect designation circuit 201. The first defect designation circuit 201 adds defect flags to the AB-image data according to the AB-image defect information 204. Although the AB-image is input from the first defect designation circuit 201 to the second defect designation circuit 202, the AB-image data is not processed by the second defect designation circuit 202, and is input to the defect correction circuit 203 at the following stage. The defect correction circuit 203 corrects the defects of the pixels of the AB-image data, to which the defect flags are added, and stores the AB-image data subjected to the defect correction in the RAM 106. The AB-image data stored in the RAM 106 is subjected to image processing, such as compression, by the image processor 108, and is then stored in the flash memory 110.

In a step S103, the CPU 103 transfers the A-image data from the RAM 106 to the defect correction section 120 (the first defect designation circuit 201), transfers the AB-image defect information 204 to the first defect designation circuit 201, and transfers the A-image defect information 205 to the second defect designation circuit 202. The first defect designation circuit 201 adds defect flags to the A-image data according to the AB-image defect information 204. After that, the A-image data is sent to the second defect designation circuit 202, and the second defect designation circuit 202 adds defect flags to the A-image data according to the A-image defect information 205. Then, the A-image data is input to the defect correction section 203. The defect correction circuit 203 corrects the defects of the pixels of the A-image data, to which the defect flags are added, and then stores the A-image data subjected to the defect correction in the RAM 106.

In a step S104, the CPU 103 transfers the AB-image data and the A-image data, subjected to the defect correction and stored in the RAM 106, to the image processor 108. The image processor 108 generates B-image data by subtracting the A-image data from the AB-image data. The A-image data and the B-image data are transferred to the AF calculation section 109 as focus detection data. The AF calculation section 109 performs correlation calculation between the A-image data and the B-image data, and calculates a focus deviation amount (defocus amount) based on the result of calculation. The CPU 103 calculates a focus driving distance based on the calculated defocus amount, and transfers the calculated focus driving distance to the focus drive circuit 112. The focus drive circuit 112 controls the driving of the focus actuator 114 according to the acquired focus driving distance, and moves the third lens group 119 forward and backward in the optical axis direction to thereby adjust the focus (perform focusing).

In a step 105, the CPU 103 determines whether or not the user has instructed termination of the moving image shooting by operating the operation section 104. If it is determined that termination of the moving image shooting has been instructed (YES to the step S105), the CPU 103 terminates the moving image shooting, whereas if it is determined that termination of the moving image shooting has not been instructed (NO to the step S105), the CPU 103 returns to the step S101.

As described above, in the present embodiment, with respect to the image pickup device formed by pixels each having a plurality of PDs with respect to one micro lens, the information on defective pixels each caused by the abnormality of a PD or the abnormality of a transfer gate and the information on defective pixels each cause by the abnormality of an element isolation region are separately stored, respectively. This prevents the address information of the defective pixels each caused by the abnormality of the PD or the abnormality of the transfer gate from being redundantly stored, and therefore, it is possible to reduce the amount of information on defective pixels, which should be stored in advance, and thereby reduce the memory capacity of the ROM 107. Further, defects occurring in the AB-image which is an output image are designated only by the first defect designation circuit 201, whereby it is possible to reduce processing load involved in the designation of the defects.

Next, a description will be given of a second embodiment of the present invention, focusing on different points from the first embodiment. In the second embodiment, the image pickup device 100 included in the image pickup apparatus 10 has a structure in which a pixel array 300 having a different pixel structure is provided, as shown in FIG. 6A, in place of the pixel array 100a described in the first embodiment.

Figure 6A:
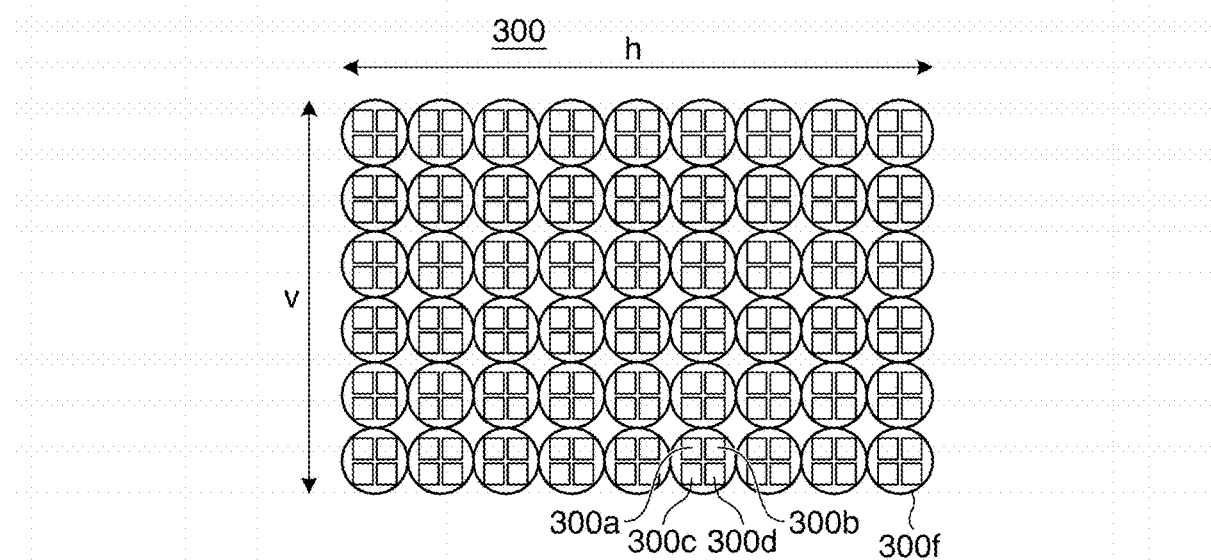
FIGS. 6A and 6B are diagrams useful in explaining the configuration of an image pickup device included in an image pickup apparatus according to a second embodiment.

FIG. 6A is a plan view useful in explaining the arrangement of the pixel array 300. The pixel array 300 has a micro lens array formed by arranging h number of micro lenses 300f and v number of micro lenses 300f on a plane in the horizontal direction and the vertical direction, respectively. One pixel has a structure in which one micro lens 300f is provided for four PDs 300a, 300b, 300c, and 300d. The PDs 300a to 300d are formed by separating one PD by element isolation regions, as described hereinafter. Thus, by defining image pickup areas (corresponding to photoelectric conversion portions) sharing one micro lens 100f as one pixel, the pixel array 100a has a structure in which h number of pixels and v number of pixels are arranged in the horizontal direction and the vertical direction, respectively.

Figure 6B:
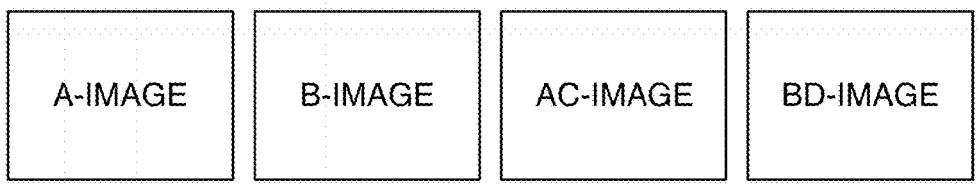

Optical images having a phase difference generated by the pupil-dividing configuration enter the PDs 300a to 300d, respectively. In the present embodiment, the PD 300a is a photoelectric conversion portion for generating an A-image, and similarly, the PDs 300b, 300c, and 300d are photoelectric conversion portions for generating a B-image, a C-image, and a D-image respectively. Signals (electric charges) accumulated in the PDs 300a to 300d are output to the outside in a predetermined combination by the same operation as the operation for reading out signals from the pixel array 100a, described in the first embodiment. FIG. 6B shows the A-image, the B-image, an AC-image, and a BD-image formed based on pixel signals output from the image pickup device including the pixel array 300. In the present embodiment, the A-image based on the signals output from the PD 300a and the B-image based on the signals output from the PD 300b are read out by way of examples of an image based on signals read out from one of the four PDs 300a to 300d. Further, The AC-image formed by adding respective signals output from the PD 300a and the PD 300c, and the BD-image formed by adding respective signals output from the PD 300b and the PD 300d are read out by way of examples of an image formed by adding signals output from part of the four PDs 300a to 300d.

FIG. 7 is a diagram showing the arrangement of a PD 300m of one pixel of the pixel array 300. In the PD 300m, the PDs 300a and 300b are separated by an element isolation region 309, and the PDs 300a and 300c are separated by an element isolation region 310. Further, the PDs 300b and 300d are separated by an element isolation region 311, and the PDs 300c and 300d are separated by an element isolation region 312. The PDs 300a, 300b, 300c, and 300d are provided with transfer gates 305a, 305b, 305c, and 305d, respectively. By controlling on/off of the transfer gates 305a to 305d, readout of the signals from the PDs 300a to 300d to the readout circuit 130 is controlled, respectively.

There are four types of defects occurring in the PD 300m as a component of the pixel array 300. A first-type defect (hereafter referred to as "the first defect") is caused by mixing of impurities into the PD 300m or an abnormality of any of the transfer gates 305a to 305d. A second-type defect (hereafter referred to as "the second defect") is caused by an abnormality of the element isolation region 309 or the element isolation region 312. A third-type defect (hereafter referred to as "the third defect") is caused by an abnormality of the element isolation region 310. A fourth-type defect (hereafter referred to as "the fourth defect") is caused by an abnormality of the element isolation region 311. Although in the present embodiment, the causes of defects are classified into these four types, the method of classifying the causes of defects is not limited to this.

A pixel having the first defect causes defects in both of the read-out AC-image and BD-image, and therefore, an ABCD-image formed by adding the AC-image and the BD-image also becomes a defective image. A pixel having the second defect causes a defect in each of the read-out AC-image and BD-image due to mixing of an electric charge from the adjacent PD, but does not cause a defect in the ABCD-image formed by adding the AC-image and the BD-image. A pixel having the third defect does not cause a defect in the read-out AC-image, but causes a defect in the A-image or the C-image generated by processing, described hereinafter. A pixel having the fourth defect does not cause a defect in the read-out BD-image, but causes a defect in the B-image or the D-image generated by the processing, described hereinafter.

A description will be given of the defect correction section 120 in a case where the image pickup device 100 having the pixel array 300 is used in the image pickup apparatus 10. FIG. 8 is a block diagram of the defect correction section 120 provided in the image pickup apparatus 10 including the image pickup device 100 having the pixel array 300. The defect correction section 120 includes a first defect designation circuit 401, a second defect designation circuit 402, a third defect designation circuit 403, and a defect correction circuit 404. ABCD-image defect information 405 stored in the ROM 107 is input to the first defect designation circuit 401, and AC-image defect information 406 stored in the ROM 107 is input to the second defect designation circuit 402. A-image defect information 407 or B-image defect information 408, stored in the ROM 107, is input to the third defect designation circuit 403. The first defect designation circuit 401, the second defect designation circuit 402, and the third defect designation circuit 403 add defect flags to pixels included in the input image data and corresponding to addresses included in the input defect information. In a case where a pixel input to the defect correction circuit 404 has a defect flag added thereto, the defect correction circuit 404 performs defect correction by calculating a pixel value by interpolation using pixel values of surrounding pixels for which the same color filter is provided.

ABCD-image defect information 405 is information on defective pixels extracted by evaluating the ABCD-image generated by adding the AC-image and the BD-image in the inspection process for the image pickup device 100, and includes the addresses of pixels having the above-mentioned first defect. The AC-image defect information 406 is information (addresses) of defective pixels specific to the AC-image, which is obtained by deleting the addresses included in the ABCD-image defect information 405 from the addresses of defective pixels extracted by evaluating the AC-image in the inspection process for the image pickup device 100. That is, the AC-image defect information 406 indicates the addresses of pixels having the above-mentioned second defect. The A-image defect information 407 is information (addresses) of defective pixels specific to the A-image, which is obtained by deleting the addresses included in the ABCD-image defect information 405 and the AC-image defect information 406 from the addresses of defective pixels extracted by evaluating the A-image in the inspection process for the image pickup device 100. That is, the A-image defect information 407 indicates the addresses of pixels having the above-mentioned third defect. The B-image defect information 408 is information (addresses) of defective pixels specific to the B-image, which is obtained by deleting the addresses included in the ABCD-image defect information 405 and the AC-image defect information 406 from the addresses of defective pixels extracted by evaluating the B-image in the inspection process for the image pickup device 100. That is, the B-image defect information 408 indicates the addresses of pixels having the above-mentioned fourth defect. Note that the addresses included in the AC-image defect information 406 are the same as the addresses of defective pixels in the BD-image, and hence the defect information of the BD-image is not needed.

Figure 9:
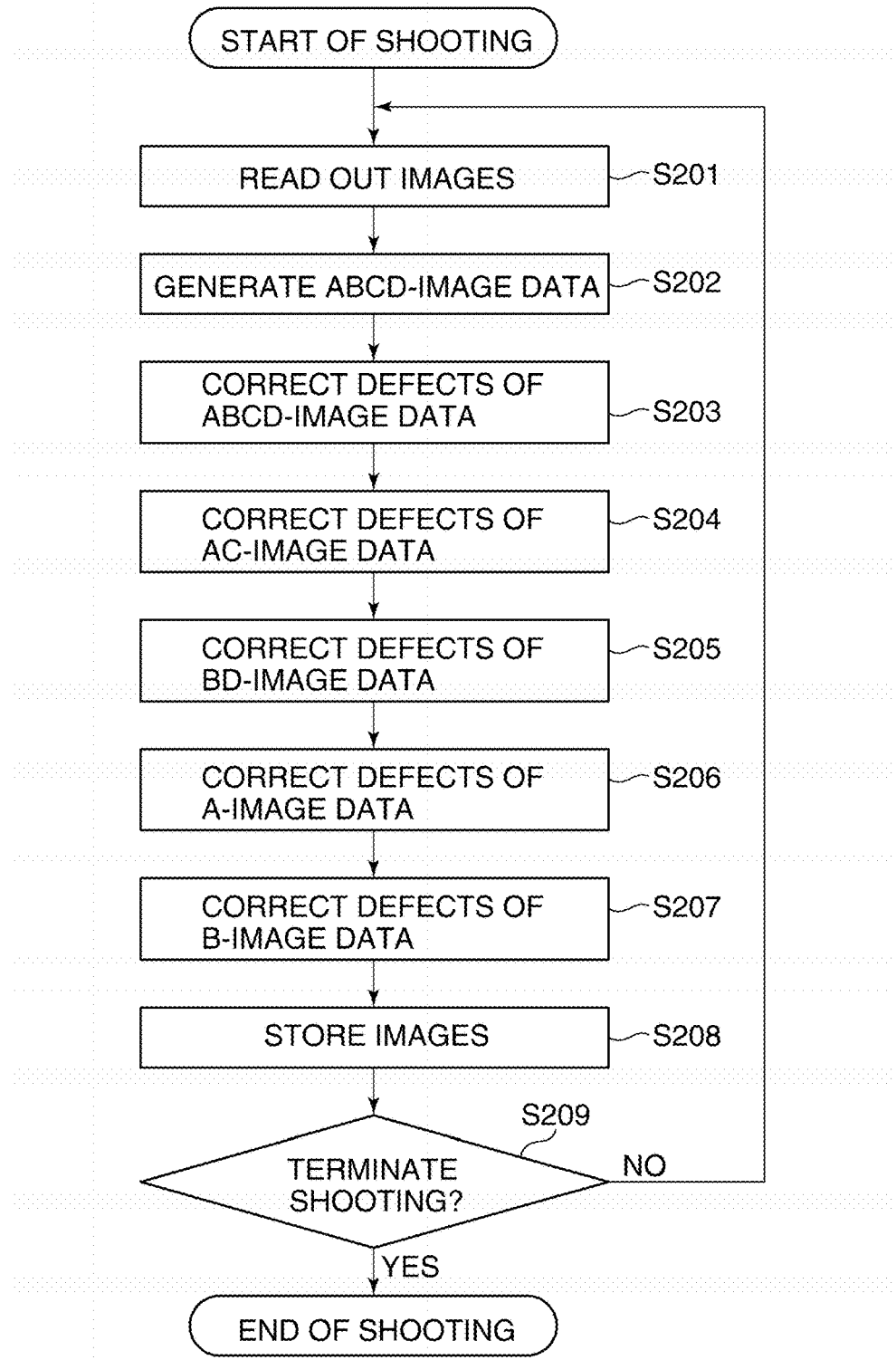
FIG. 9 is a flowchart of a still image-shooting process performed by the image pickup apparatus according to the second embodiment.

FIG. 9 is a flowchart of a still image-shooting process performed by the image pickup apparatus 10 including the image pickup device 100 having the pixel array 300 shown in FIG. 6A, and the defect correction section 120 shown in FIG. 8. The processing of each step of the still image-shooting process in FIG. 9 is realized by the CPU 103 that controls the operations of the components of the image pickup apparatus 10 by loading programs stored in the ROM 107 into the RAM 106. When shooting is started and focus adjustment with respect to a predetermined object is performed by a user's operation of the operation section 104, an A-image and a B-image, for example, are read out from the image pickup device 100, and focus adjustment with respect to the predetermined object is performed by the imaging surface phase difference AF method. In a step S201, when a release button as one of operation members of the operation section 104 is pressed, the CPU 103 reads out an A-image, a B-image, an AC-image, and a BD-image from the image pickup device 100. The read-out A-image, B-image, AC-image, and BD-image are converted to digital data by the AFE 101, and are stored in the RAM 106.

In a step S202, the CPU 103 transfers the AC-image data and the BD-image data from the RAM 106 to the image processor 108. The image processor 108 generates ABCD-image data by adding the received AC-image data and BD-image data, and stores the generated ABCD-image data in the RAM 106. In a step S203, the CPU 103 transfers the ABCD-image data from the RAM 106 to the defect correction section 120, and transfers the ABCD-image defect information 405 to the first defect designation circuit 401. The first defect designation circuit 401 adds defect flags to the ABCD-image data according to the ABCD-image defect information 405. Although the ABCD-image data to which the defect flags are added is input to the second defect designation circuit 402 and then to the third defect designation circuit 403, the ABCD-image data is input, without being processed by these circuits 402 and 403, to the defect correction circuit 404. The defect correction circuit 404 corrects the defects of pixels of the ABCD-image data, to which the defect flags are added, and stores the corrected ABCD-image data in the RAM 106.

In a step S204, the CPU 103 transfers the AC-image data from the RAM 106 to the defect correction section 120 (the first defect designation circuit 401). Further, the CPU 103 transfers the ABCD-image defect information 405 to the first defect designation circuit 401, and transfers the AC-image defect information 406 to the second defect designation circuit 402. Defect flags are added to the AC-image data by the first defect designation circuit 401 according to the ABCD-image defect information 405, and then, defect flags are added to the AC-image data by the second defect designation circuit 402 according to the AC-image defect information 406. Although the AC-image data to which the defect flags are thus added is input to the third defect designation circuit 403, the AC-image data is input, without being processed by the third defect designation circuit 403, to the defect correction circuit 404. The defect correction circuit 404 corrects the defects of the pixels of the AC-image data, to which the defect flags are added, and stores the corrected AC-image data in the RAM 106.

In a step S205, the CPU 103 transfers the BD-image data from the RAM 106 to the defect correction section 120 (the first defect designation circuit 401), transfers the ABCD-image defect information 405 to the first defect designation circuit 401, and transfers the AC-image defect information 406 to the second defect designation circuit 402. Defects flag are added to the BD-image data by the first defect designation circuit 401 according to the ABCD-image defect information 405, and then, defect flags are added to the BD-image data by the second defect designation circuit 402 according to the AC-image defect information 406. Although the BD-image data to which the defect flags are added is input to the third defect designation circuit 403, the BD-image data is input, without being processed by the third defect designation circuit 403, to the defect correction circuit 404. The defect correction circuit 404 corrects the defects of the pixels of the BD-image data, to which the defect flags are added, and stores the corrected BD-image data in the RAM 106.

In a step S206, the CPU 103 transfers the A-image data from the RAM 106 to the defect correction section 120 (the first defect designation circuit 401). Further, the CPU 103 transfers the ABCD-image defect information 405 to the first defect designation circuit 401, transfers the AC-image defect information 406 to the second defect designation circuit 402, and transfers the A-image defect information 407 to the third defect designation circuit 403. Defect flags are added to the A-image data by the first defect designation circuit 401 according to the ABCD-image defect information 405, and then, defect flags are added to the A-image data by the second defect designation circuit 402 according to the AC-image defect information 406. Further, defect flags are added to the A-image data by the third defect designation circuit 403 according to the A-image defect information 407. The A-image data to which the defect flags are thus added is input to the defect correction circuit 404. The defect correction circuit 404 corrects the defects of the pixels of the A-image data, to which the defect flags are added, and stores the corrected A-image data in the RAM 106.

In a step S207, the CPU 103 transfers the B-image data from the RAM 106 to the defect correction section 120 (the first defect designation circuit 401). Further, the CPU 103 transfers the ABCD-image defect information 405 to the first defect designation circuit 401, transfers the AC-image defect information 406 to the second defect designation circuit 402, and transfers the B-image defect information 408 to the third defect designation circuit 403. Defect flags are added to the B-image data by the first defect designation circuit 401 according to the ABCD-image defect information 405, and then, defect flags are added to the B-image data by the second defect designation circuit 402 according to the AC-image defect information 406. Further, defect flags are added to the B-image data by the third defect designation circuit 403 according to the B-image defect information 408. The B-image data to which the defect flags are thus added is input to the defect correction circuit 404, and the defect correction circuit 404 corrects the defects of the pixels of the B-image data, to which the defect flags are added, and stores the corrected B-image data in the RAM 106.

In a step S208, the CPU 103 transfers the ABCD-image data, the AC-image data, the BD-image data, the A-image data, and the B-image data, stored in the RAM 106, to the image processor 108. The image processor 108 performs processing, such as compression, on each image data, and then, stores each processed image data in the flash memory 110 as one file. In a step S209, the CPU 103 determines whether or not termination of shooting has been instructed via the operation section 104. If it is determined that termination of shooting has not been instructed (NO to the step S209), the CPU 103 returns to the step S201, whereas if it is determined that termination of shooting has been instructed (YES to the step S209), the CPU 103 terminates the present process.

Note that in the present embodiment, it is possible to perform refocusing (change of the focus position) with respect to the image data stored in the flash memory 110. More specifically, when a refocus mode is instructed via the operation section 104, the CPU 103 displays an ABCD-image based on the ABCD-image data stored in the flash memory 110 on the display section 105. Then, when a new focus position is designated via the operation section 104, the CPU 103 sends the A-image data, the B-image data, the AC-image data, and the BD-image data, stored in the flash memory 110, to the image processor 108. According to instructions from the CPU 103, the image processor 108 generates C-image data by subtracting the A-image data from the AC-image data, and D-image data by subtracting the B-image data from the BD-image data, and stores the generated C-image data and D-image data in the RAM 106. Then, the image processor 108 adds the A-image data, B-image data, the C-image data, and the D-image data, stored in the RAM 106, after shifting the positions of images based on the respective data items, to thereby generate new ABCD-image data of an ABCD-image focused to the designated position. The new ABCD-image data is subjected to processing by the image processor 108, such as compression, and is then stored in the flash memory 110.

In the present embodiment, by holding the defect information specific to each of the A-image, the B-image, the AC-image, and the BD-image, which are read out from the image pickup device 100, it is possible to hold information on defects caused by an abnormality of the element isolation regions of the PD without redundantly holding the information. This makes it possible to reduce the amount of information on defective pixels, which should be stored in advance, and thereby reduce the memory capacity of the ROM 107.

Next, a description will be given of a third embodiment of the present invention. In the first and second embodiments, the description is given of the configuration for reducing the memory capacity of the ROM 107 by reducing the amount of information on defective pixels, which is stored in advance. On the other hand, the third embodiment is characterized in a process for generating address information actually used for correction of defective pixels using the defect information stored in the ROM 107. With this configuration, even when the number of photoelectric conversion portions included in one pixel is increased, it is possible to further reduce the memory capacity of the ROM 107 by using processes generated by the present embodiment, and properly correct the defective pixels.

Figure 10:
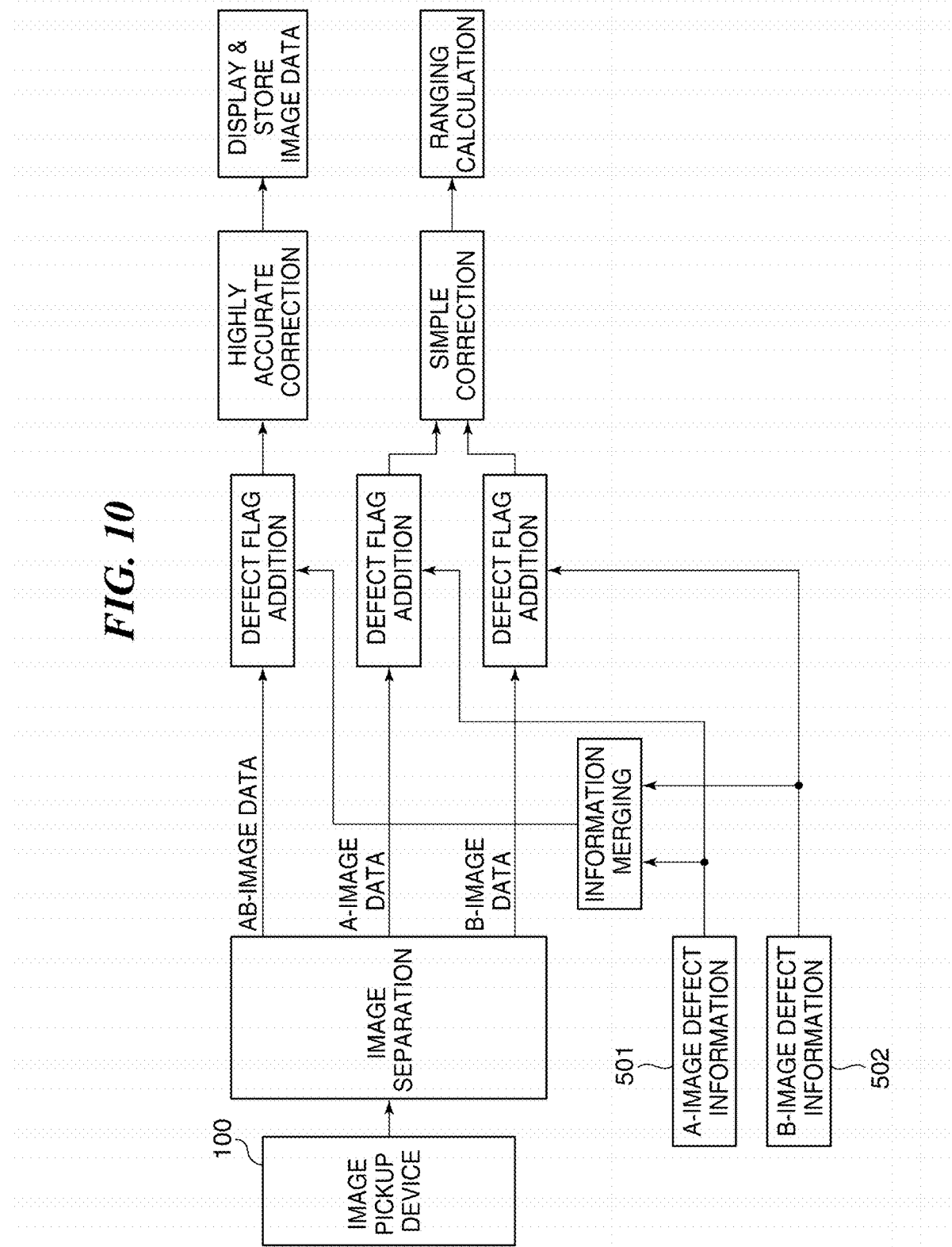
FIG. 10 is a diagram showing processing paths of signals output from an image pickup device included in an image pickup apparatus according to a third embodiment.

FIG. 10 is a diagram showing processing paths of signals output from the image pickup device 100. Note that in the present embodiment, it is assumed that the image pickup device 100 includes the pixel array 100a described with reference to FIGS. 2A to 2C, and the A-image and the AB-image are sequentially read out from the image pickup device 100. Further, the ROM 107 stores A-image defect information 501 and B-image defect information 502, which are extracted in the inspection process for the image pickup device 100. In the present embodiment, assuming that an input image is a 14-bit image and a signal input range is from 0 to 16383 LSB, pixels having values of 1 to 16383 LSB are normal signal pixels, and a pixel having a value of 0 LSB is a defective pixel.

The AB-image read out from the image pickup device 100 is used as an image for display and storage. Further, the image processor 108 generates the B-image data by subtracting the A-image data from the AB-image data. The A-image data and the B-image data are used for ranging calculation. The A-image data and the B-image data are input to the defect correction section 120, and the defect correction section 120 adds defect flags to the A-image data input thereto according to the A-image defect information 501, and further, adds defect flags to the B-image data input thereto according to the B-image defect information 502. Then, the defect correction section 120 performs simple correction for ranging on the A-image data and the B-image data, to which the defect flags are added. The AF calculation section 109 performs ranging calculation based on the A-image data and the B-image data on which the simple correction has been performed, by the imaging surface phase difference AF method. Note that the simple correction performed on the A-image data and the B-image data will be described hereinafter with reference to FIG. 12.

On the other hand, the defect correction section 120 adds defect flags to the AB-image data based on defect information obtained by integrating (merging) the A-image defect information 501 and the B-image defect information 502.

Note that the A-image defect information 501 and the B-image defect information 502 are merged by the CPU 103, and the merging method will be described hereinafter with reference to FIG. 11. The defect correction section 120 performs highly accurate defect correction on the AB-image data to which the defect flags are added. The AB-image data generated as described above for display and storage is stored in the flash memory 110. Note that the highly accurate defect correction performed on the A-image and the AB-image data will be described hereinafter with reference to FIG. 13.

FIG. 11 is a diagram useful in explaining the method of merging the A-image defect information 501 and the B-image defect information 502. The CPU 103 switches the method of merging the A-image defect information 501 and the B-image defect information 502 depending on the defect type, as shown in FIG. 11. To make it possible to switch the merging method and merge the information items, the A-image defect information 501 and the B-image defect information 502 each include at least address information, defect type information, and defect level information of defective pixels, and these information items will be described hereinafter with reference to FIG. 14.

The CPU 103 compares the A-image defect information 501 and the B-image defect information 502, and performs merge processing. The merge processing is performed by a merging method associated with the defect type information included in the defect information. For example, assuming that the defect level of the defective pixel in the A-image is represented by "Lv_A", the defect level of the defective pixel in the B-image is represented by "Lv_B", and the defect level after merging is represented by "Lv_Mrg", when the defect information merging method is addition, there holds a relationship of "Lv_Mrg=Lv_A+Lv_B. The defect type for which such addition is performed includes defects caused by an abnormality of an Si substrate on which the photoelectric conversion portions are formed, such as a white spot defect, an FD leak defect, and an RTS defect. On the other hand, for a sensitivity defect caused by an abnormality of the amount of incident light to the photoelectric conversion portions, averaging is performed to calculate an average value, and hence, in this case, there holds a relationship of Lv_Mrg=(Lv_A+Lv_B)/2. Note that, for the sensitivity defect, in stead of the average value, there may be calculated a weighted average value of defect levels weighted according to an image height. Further, the defect type includes a defect occurring only with the AB-image (hereinafter referred to as the "image proper defect"), and for this type of the defect, the defect information is directly used without being merged. Further, there is a case where different types of defects occur in the same pixel, and in this case, it is necessary to correct the defects independently of each other, and hence two defect information items are output with respect to the same pixel. As described above, by switching the merging method depending on the cause of the defect of each defective pixel, it is possible to merge (generate) proper defect information.

FIG. 12 is a diagram useful in explaining the simple defect correction method for correcting defective pixels. To make it possible to correct the A-image data and the B-image data for ranging by the defect correction section 120 inexpensively configured, in the present embodiment, the defective pixels are corrected by referring to the data only in the horizontal direction. More specifically, assuming that a defective pixel to be corrected is a pixel positioned in the center, as viewed in FIG. 12, which has a pixel value Rt, pixel values R1, R2, R3, and R4 of respective sets of two pixels of the same color positioned on the right and left sides (in the horizontal direction) of the defective pixel are extracted. Then, a median filter is applied to these pixel values including the pixel value Rt, whereby a median Md (=Median (R1, R2, R3, R4, Rt)) is selected. By replacing the pixel value of the defective pixel by the median Md (PixCorrect=Md), it is possible to correct the defective pixel. The correction method is not limited to this, but the defective pixel may be corrected using an average value of the pixel values R2 and R4 of the two same color positioned on the opposite sides of the pixel having the pixel value Rt (PixCorrect=(R2+R4)/2).

FIG. 13 is a diagram useful in explaining the highly accurate defect correction method for correcting defective pixels. The color filter of a pixel to be corrected, which is positioned in the center, is "R (red)", and therefore, the defective pixel is corrected using R pixels surrounding the defective pixel. In this case, first, differences between the pixel values of pixels on opposite sides are calculated by Diff1=|R0−R8|, Diff2=|R1−R7|, Diff3=|R2−R6|, and Diff4=|R3−R5|, respectively, and then, the minimum value of Diff1 to Diff4 is detected. This is because if the difference value is small, it can be said that there is no edge between the pixels, and it is possible to properly correct the defective pixel by pixel interpolation. An average value is calculated from a combination of pixels having the minimum difference value therebetween, and is set as a pixel value of the defective pixel. For example, if Diff1 is the minimum value, a correction value PixCorrect of the defective pixel is determined by PixCorrect=(R0+R8)/2. This calculation processing is performed for all defective pixels to be corrected, whereby the defective pixels are corrected (calculated by interpolation). Note that the method of determining the pixel value used for correction of the defective pixel is not limited to the above. For example, the defective pixel may be corrected using an average value of the pixel values of all pixels surrounding the defective pixel, or may be corrected using an average value calculated by using all combinations each having a difference between pixel values in each direction, which is not larger than a predetermined value.

Figure 14:
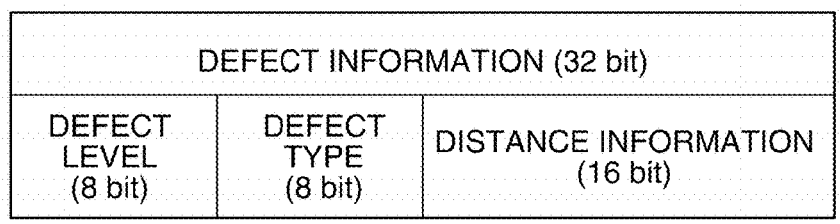
FIG. 14 is a diagram useful in explaining an example of the format of defect information.

FIG. 14 is a diagram useful in explaining an example of the structure of the defect information (the A-image defect information 501 and the B-image defect information 502) stored in the ROM 107. In the present embodiment, one defect information item is stored as 32-bit data, and includes distance information (16 bits), the defect type (8 bits), and the defect level (8 bits). The distance information indicates a distance from one defect to the next defect, in terms of the number of pixels. This is defined by a format of so-called run-length compression and has an advantage that it is possible to store an amount of data more compressed than data stored based on X-Y coordinates (address). Therefore, it is possible to reduce the memory capacity of the ROM 107.

The defect type indicates one of the defect types shown in FIG. 11, and includes the white spot defect, the sensitivity defect, the FD leak defect, the RTS defect, the image proper defect, and so forth. In the defect information, defects are managed using IDs assigned to these defect types, respectively. Note that the defects are different in occurrence condition, one defect type to another, and hence it is desirable to change the correction amount according to the shooting condition, for example, as in changing the correction amount for a white defect according to a shutter speed, and changing the correction amount for a FD leak defect according to a temperature. The defect level is information indicating the necessity (importance) of defect correction. That is, a defect having a high defect level is a defect needed to be corrected in any shooting condition, and therefore, a pixel having this defect is always corrected. On the other hand, a defect having a low defect level is a defect occurring only in high-sensitivity shooting, long-time shooting, shooting at a high temperature, and so forth, and whether or not to correct a pixel having this defect is determined, by taking the shooting conditions into account.

In the present embodiment, the defect information items of the A-image and the B-image are stored independently of each other, and are merged when correcting defects. This makes it possible to reduce the amount of defect information to be stored in the ROM 107. Further, it is possible to correct the AB-image data for display and storage, by obtaining appropriate defect information, and determine a defocus amount by properly correcting the A-image data and the B-image data for ranging.

Incidentally, to enhance the ranging accuracy, it is ideal to acquire the A-image and the B-image as images for ranging, from all rows of the image pickup device 100, but in this case, it takes a long time to read out the signals from the image pickup device 100. As a result, the frame rate is reduced, resulting in reduced continuous shooting speed, and hence it is desirable to reduce the amount of reading of the A-image for ranging, to the necessary minimum, and thereby reduce the generation of the B-image to the minimum.

Figure 15:
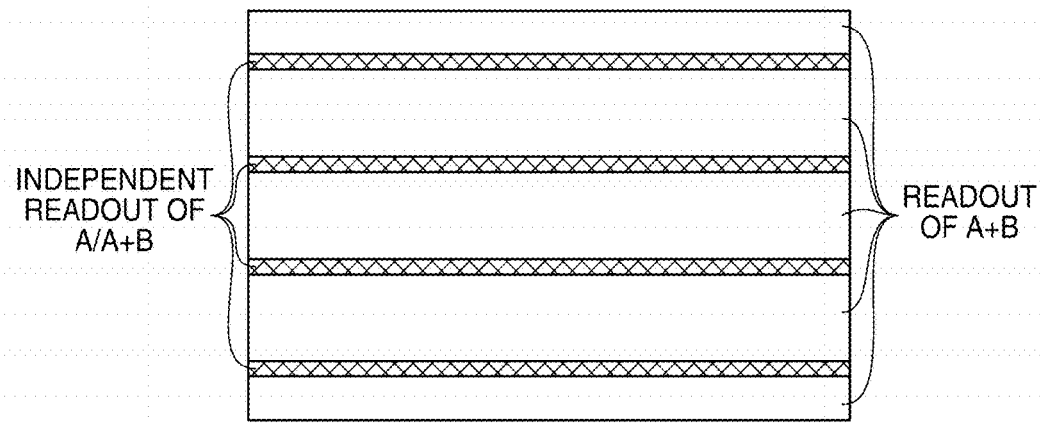
FIG. 15 is a diagram useful in explaining an example of how signals are read out from the image pickup device.

FIG. 15 is a diagram useful in explaining an example of how signals are read out from the image pickup device 100. In the rows of "independent readout of A/A+B" in FIG. 15, the A-image data and the AB-image data are read out independently of each other, whereby the image processor 108 generates the B-image data by subtracting the A-image data from the AB-image data, and the AF calculation section 109 performs ranging based on the A-image data and the B-image data by the imaging surface phase difference AF method. In the rows of "readout of A+B" in FIG. 15, only the AB-image data is read out. For example, in a case where an object is standing still, or the priority is given to the continuous shooting speed, it is unnecessary to acquire only the A-image data, and hence only the AB-image data is read out from the whole image pickup device 100. Thus, in a case where readout of signals for ranging and readout of signals for display and storage are separately performed, the A-image defect information 501 and the B-image defect information 502 are independently stored for pixels of the rows from which "independent readout of A/A+B" is performed, and the processing is performed according to the processing paths in FIG. 10. On the other hand, the defect information of image proper defects is stored for the rows from which "readout of A+B" is performed. In a case where only the AB-image data is read out from the whole image pickup device 100, it is only required to use the defect information of image proper defects as it is, also for the rows from which "independent readout of A/A+B" is performed, and it is unnecessary to merge the A-image defect information 501 and the B-image defect information 502.

Next, a description will be given of a fourth embodiment of the present invention. In the third embodiment, the A-image data and the AB-image data are read out, the B-image data is generated by subtracting the A-image data from the AB-image data, and ranging is performed using the A-image data and the B-image data. On the other hand, in the present embodiment, the B-image data is read out after reading out the A-image data, and the AB-image data is generated by adding the A-image data and the B-image data.

Points changed from the processing paths in FIG. 10, in this case, will be described. An A-image and a B-image are sequentially output from the image pickup device 100 and are converted to the A-image data and the B-image data, respectively. The A-image data and the B-image data are input to the defect correction section 120, wherein the A-image data and the B-image data are subjected to the simple correction according to the A-image defect information 501 and the B-image defect information 502, and then the corrected A-image data and B-image data are input to the AF calculation section 109. The AF calculation section 109 calculates a defocus amount based on the corrected A-image data and B-image data by the imaging surface phase difference AF method. Note that as described with reference to FIG. 15, in a case where the defocus amount is calculated only with respect to specific rows (independent readout of A/A+B), it is unnecessary to input the A-image data and the B-image data, which are read out from the rows (readout of A+B) for which it is unnecessary to calculate the defocus amount, to the defect correction section 120. Further, the A-image data and the B-image data are input to the image processor 108, which generates the AB-image data by adding the A-image data and the B-image data. The defect correction section 120 performs highly accurate correction on the AB-image data, based on the defect information obtained by merging the A-image defect information 501 and the B-image defect information 502.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the first and second embodiments, the defect correction section 120 is configured to have a plurality of defect designation circuits. However, this is not limitative, but the defect correction section 120 may include one defect designation circuit, and may be configured to perform correction processing, by switching inputting of the defect information to the defect designation circuit, and inputting associated image data to the defect designation circuit. Further, although the description has been given of the configuration including a plurality of defect information items, this is not limitative. For example, a grade may be provided for each of types of defective pixels (the first to fourth defects) included in the image pickup device 100, for coding of each defective pixel type, whereby a code may be added to the address information of each defective pixel (code corresponding to the grade may be added to each defective pixel). Then, which grade of defects is to be designated is determined according to the image data (A-image data, B-image data, AC-image data, or BD-image data) input to the defect correction section 120, and the address information to which the code corresponding to the determined grade has been added may be read out from the ROM 107.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-246748 filed Dec. 20, 2016, which is hereby incorporated by reference herein in its entirety.

What is claimed is:

1. An image pickup apparatus comprising:
an image pickup device that has a plurality of pixels each of which is provided with a plurality of photoelectric conversion portions with respect to one micro lens thereof, such that light passing through a photographic optical system is pupil-divided;
a holding unit configured to hold first defect information indicative of defect information of first image data generated by adding all signals output from the plurality of photoelectric conversion portions of each of the plurality of pixels and reading out a resulting added signal, and second defect information obtained by excluding information redundant with the first defect information from defect information of second image data generated by reading out a signal from one of the plurality of photoelectric conversion portions of each of the plurality of pixels or by adding signals output from part of the plurality of photoelectric conversion portions and reading out a resulting added signal;
a designation unit configured to designate defective pixels included in the second image data based on the first defect information and the second defect information; and
a correction unit configured to correct the second image data by correcting defective pixels designated by the designation unit.

2. The image pickup apparatus according to claim 1, wherein the designation unit designates defective pixels included in the first image data based on the first defect information, and
wherein the correction unit corrects the first image data by correcting the defective pixels designated by the designation unit.

3. The image pickup apparatus according to claim 1, further comprising a switching unit configured to switch information input from the holding unit to the designation unit between the first defect information and the second defect information.

4. The image pickup apparatus according to claim 1, wherein the designation unit includes a unit for designating positions of defective pixels included in the first image data and the second image data, based on the first defect information, and a unit for designating positions of defective pixels included in the second image data, based on the second defect information, as separate units.

5. The image pickup apparatus according to claim 1, wherein the plurality of photoelectric conversion portions of each of the plurality of pixels are each formed by dividing a photodiode by an element isolation region,
   wherein the first defect information is information of each pixel having a defect caused by an abnormality of the photodiode or an abnormality of transfer gates for reading out signals from the photoelectric conversion portions, and
   wherein the second defect information is information of each pixel having the defect caused by the abnormality of the element isolation region.

6. The image pickup apparatus according to claim 1, wherein in the second defect information, each defective pixel is specified, in association with each method of reading out signals from the photoelectric conversion portions for generating the second image data.

7. The image pickup apparatus according to claim 1, wherein the holding unit holds the first defect information and the second defect information, by providing a grade for each of types of defective pixels, and adding a code corresponding to the grade to each defective pixel,
   wherein the designation unit determines which grade to be designated, according to from which of the plurality of photoelectric conversion portions, a pixel of an image read out from the image pickup device has been read out, reads out information on pixels to which a code corresponding to the determined grade is added, from the holding unit, and designates a position of each defective pixel included in the read image.

8. An image pickup apparatus comprising:
   an image pickup device that has a plurality of pixels each of which is provided with a plurality of photoelectric conversion portions with respect to one micro lens thereof, such that light passing through a photographic optical system is pupil-divided;
   a readout unit configured to read out a plurality of pupil-divided images from the image pickup device;
   a holding unit configured to hold defect information on defective pixels included in each of the plurality of pupil-divided images, on an image-by-image basis; and
   a generation unit configured to generate information on defective pixels included in an image for storage, by switching a method of generating the information on the defective pixels included in the image for storage, based on the defect information held for each of the plurality of pupil-divided images, according to a method of reading out signals from the plurality of photoelectric conversion portions, or according to a defect type of defective pixels indicated by the defect information.

9. The image pickup apparatus according to claim 8, wherein the image for storage is generated by adding all signals output from the plurality of photoelectric conversion portions of each of the plurality of pixels and reading out a resulting added signal, or generated by adding images each generated by reading out respective signals from the plurality of photoelectric conversion portions of each of the plurality of pixels, or by adding images each generated by adding signals output from part of the plurality of photoelectric conversion portions and reading out a resulting added signal.

10. The image pickup apparatus according to claim 8, wherein in a case where the defect type included in the defect information is a white spot defect, an FD leak defect, or an RTS defect, the generation unit generates information on defective pixels included in the image for storage, by adding respective levels of the defects.

11. The image pickup apparatus according to claim 8, wherein in a case where the defect type included in the defect information is a sensitivity defect, the generation unit generates information on defective pixels included in the image for storage, by averaging levels of the defects, or by averaging levels of the defects weighted according to an image height.

12. A method of controlling an image pickup apparatus including an image pickup device that has a plurality of pixels each of which is provided with a plurality of photoelectric conversion portions with respect to one micro lens thereof, such that light passing through a photographic optical system is pupil-divided, comprising:
   generating first image data by adding all signals output from the plurality of photoelectric conversion portions of each of the plurality of pixels and reading out a resulting added signal;
   generating second image data by reading out a signal from one of the plurality of photoelectric conversion portions of each of the plurality of pixels or by adding signals output from part of the plurality of photoelectric conversion portions and reading out a resulting added signal;
   designating defective pixels included in the second image data, based on first defect information indicative of defect information of the first image data and second defect information formed by excluding information redundant with the first defect information from defect information of the second image data; and
   correcting the second image data by correcting the designated defective pixels.

13. A method of controlling an image pickup apparatus including an image pickup device that has a plurality of pixels each of which is provided with a plurality of photoelectric conversion portions with respect to one micro lens thereof, such that light passing through a photographic optical system is pupil-divided, comprising:
   reading out a plurality of pupil-divided images from the image pickup device;
   generating information on defective pixels included in an image for storage, based on defect information on defective pixels included in each of the plurality of pupil-divided images; and
   correcting defective pixels included in the image for storage, using the generated information,
   wherein a method of generating the information on the defective pixels included in the image for storage is switched, according to a method of reading out signals from the plurality of photoelectric conversion portions, or according to a defect type of defective pixels indicated by the defect information of each of the plurality of pupil-divided images.

14. A non-transitory computer-readable storage medium storing a computer-executable program for executing a method of controlling an image pickup apparatus including an image pickup device that has a plurality of pixels each of which is provided with a plurality of photoelectric conversion portions with respect to one micro lens thereof, such that light passing through a photographic optical system is pupil-divided,
   wherein the method comprises:

generating first image data by adding all signals output from the plurality of photoelectric conversion portions of each of the plurality of pixels and reading out a resulting added signal;

generating second image data by reading out a signal from one of the plurality of photoelectric conversion portions of each of the plurality of pixels or by adding signals output from part of the plurality of photoelectric conversion portions and reading out a resulting added signal;

designating defective pixels included in the second image data, based on first defect information indicative of defect information of the first image data and second defect information formed by excluding information redundant with the first defect information from defect information of the second image data; and correcting the second image data by correcting the designated defective pixels.

15. A non-transitory computer-readable storage medium storing a computer-executable program for executing a method of controlling an image pickup apparatus including an image pickup device that has a plurality of pixels each of which is provided with a plurality of photoelectric conversion portions with respect to one micro lens thereof, such that light passing through a photographic optical system is pupil-divided, wherein the method comprises:

reading out a plurality of pupil-divided images from the image pickup device;

generating information on defective pixels included in an image for storage, based on defect information on defective pixels included in each of the plurality of pupil-divided images; and correcting defective pixels included in the image for storage, using the generated information, wherein a method of generating the information on the defective pixels included in the image for storage is switched, according to a method of reading out signals from the plurality of photoelectric conversion portions, or according to a defect type of defective pixels indicated by the defect information of each of the plurality of pupil-divided images.

* * * * *